United States Patent [19]

Lampe

[11] Patent Number: 5,743,210
[45] Date of Patent: Apr. 28, 1998

[54] NON-SLIDING PET FOOD DISH WITH INSERT DISH

[76] Inventor: Thomas F. Lampe, 3371 Paxton Court, Marietta, Ga. 30066

[21] Appl. No.: 810,072

[22] Filed: Mar. 4, 1997

[51] Int. Cl.⁶ .................... A01K 5/01; A01K 7/00
[52] U.S. Cl. .................. 119/51.5; 119/61; 220/23.83
[58] Field of Search ................. 119/51.5, 61, 63; 220/23.83

[56] References Cited

U.S. PATENT DOCUMENTS

| | | | |
|---|---|---|---|
| D. 326,742 | 6/1992 | Tart | D30/130 |
| D. 342,353 | 12/1993 | Anastasi | D30/130 |
| 2,318,149 | 5/1943 | Ferman | 220/23.83 X |
| 3,137,272 | 6/1964 | Lepper | 119/63 X |
| 3,589,554 | 6/1971 | Smith | 220/23.83 |
| 5,117,778 | 6/1992 | Imamura | 119/51.5 |
| 5,245,948 | 9/1993 | McClellan | 119/51.5 |
| 5,253,609 | 10/1993 | Partelow et al. | 119/61 |
| 5,277,149 | 1/1994 | East | 119/51.5 |
| 5,560,315 | 10/1996 | Lampe | 119/51.5 |

FOREIGN PATENT DOCUMENTS 294467  11/1928  United Kingdom ........... 220/23.83

*Primary Examiner*—Robert P. Swiatek
*Attorney, Agent, or Firm*—Hinkle & Associates, P.C.

[57] ABSTRACT

A dish 2 for containing food and water for consumption by an animal includes an outer container 4, a holder 10 sectored to and positioned within the outer container so that water placed in the outer container completely surrounds the holder, and an insert dish 17 removably disposed within the holder for supporting pet food. Lids 6 and 14 can be secured to the outer container and the insert dish, respectively, to permit transportation and storage of the device when containing both water and food.

37 Claims, 5 Drawing Sheets

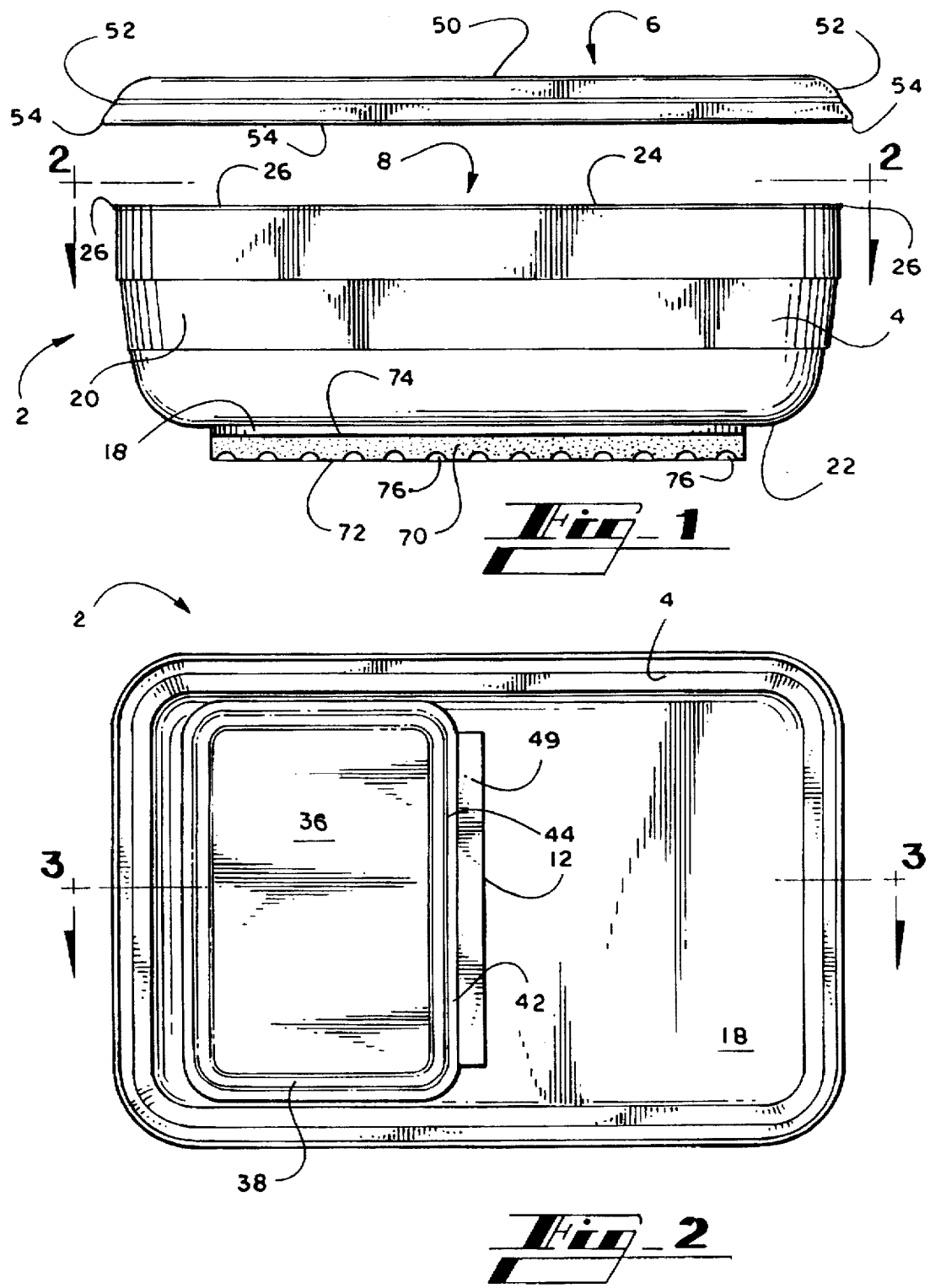

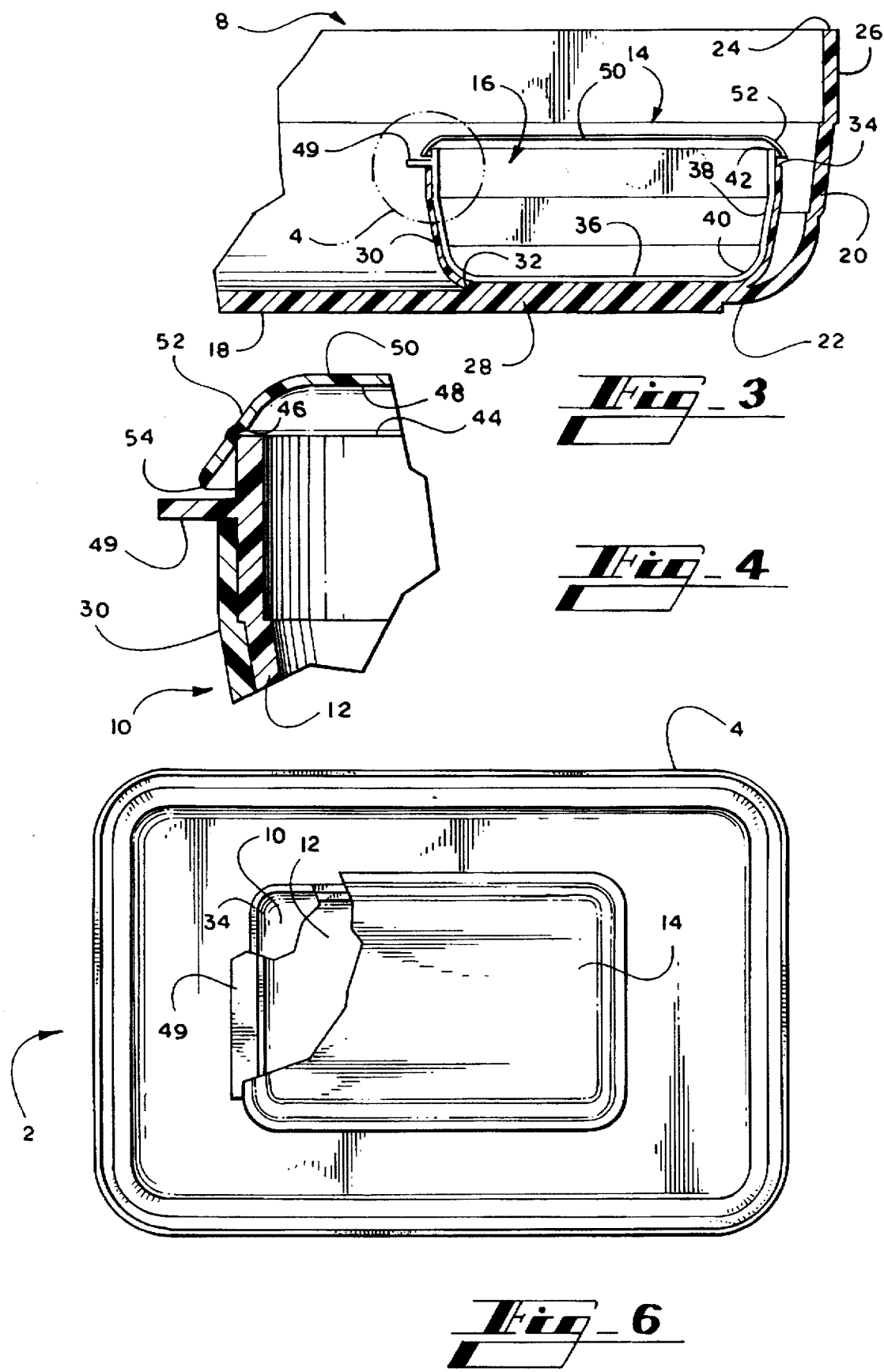

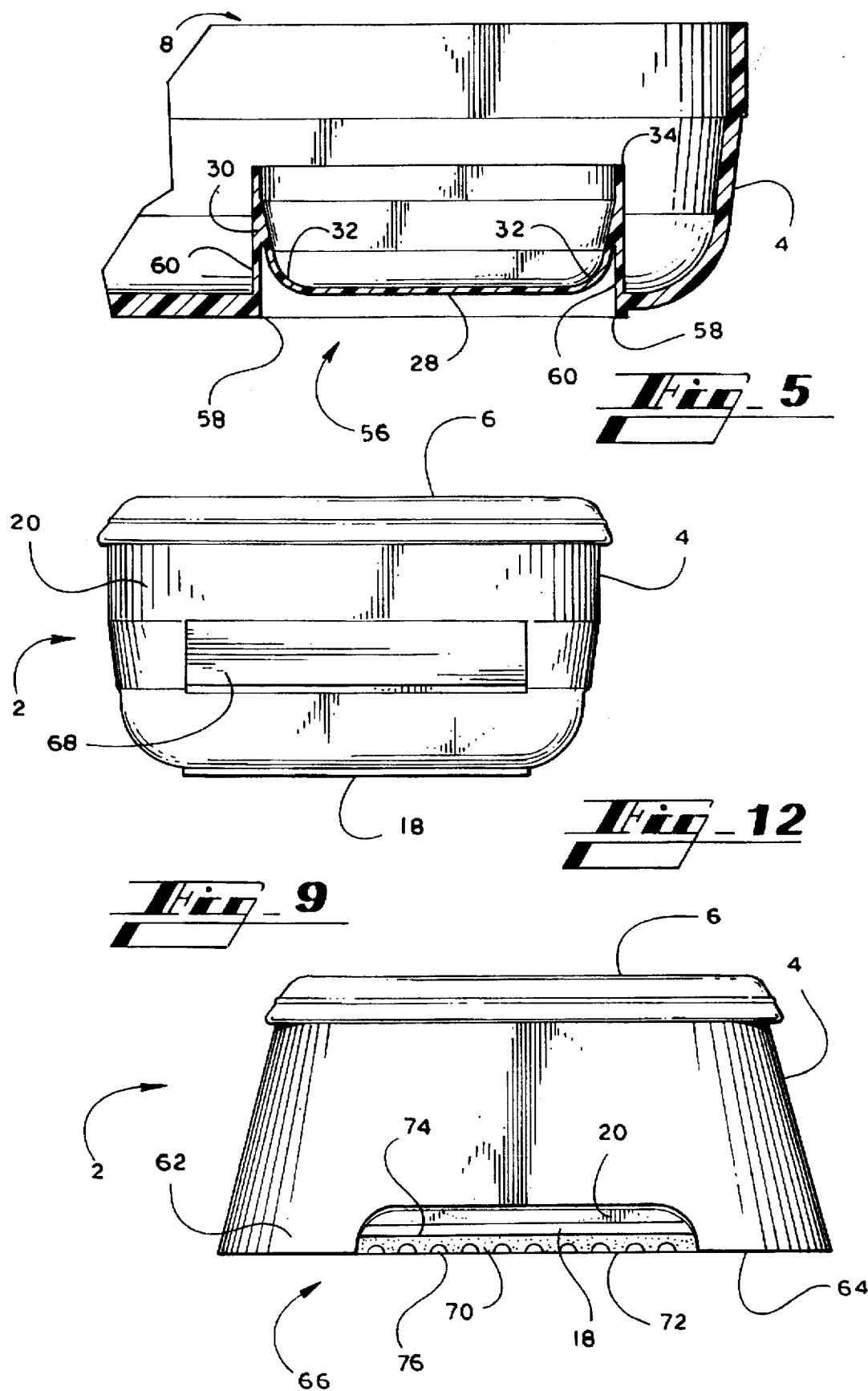

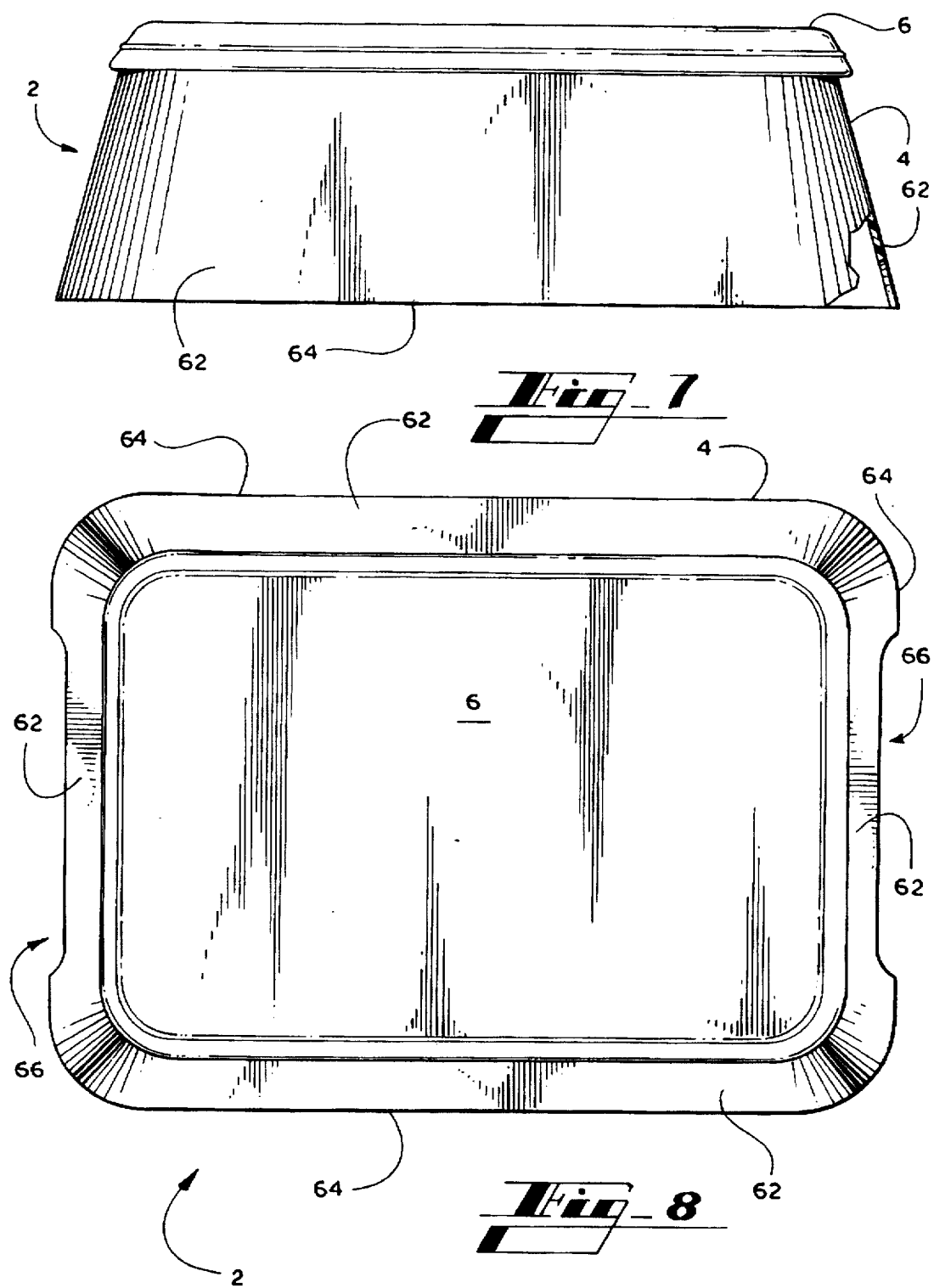

NON-SLIDING PET FOOD DISH WITH INSERT DISH

THE BACKGROUND OF INVENTION

I. Field of the Invention

The present invention relates generally to the field of animal feeding devices. More particularly, the present invention relates to a non-sliding pet food dish for containing food and water for consumption by an animal.

II. Description of the Related

The use of animal feeding devices is known in the prior art. More specifically, animal feeding devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art animal feeding devices include U.S. Pat. No. 5,277,149; U.S. Pat. No. 5,117,778; U.S. Pat. No. 5,245,948; U.S. Pat. No. 5,253,609; U.S. Pat. No. Design 342,353; and U.S. Pat. No. Design 326,742.

I described in U.S. Pat. No. 5,560,315 a Pet Food Dish for containing food and water for consumption by an animal. This device includes an outer container for containing a volume of water. An inner container is secured within the outer container for supporting pet food such that insects cannot reach the food across the water. Lids can be secure to each container to permit transportation and/or storage of the device when containing both water and food. However, if the pet food is perishable and requires refrigeration, the whole container must be stored within a refrigerator. Absent making another container of some fashion containing a volume of water accessible to the animal, the animal is deprived of water while the Pet Food Dish is stored. In other instances and for various reasons, reason it is desirable to separate the pet food from the Pet Food Dish; however, it is difficult to remove the pet food without inadvertently spilling the water. Further, as the animal takes pet food or water from the Pet Food Dish, the Pet Food Dish has an undesirable tendency to slide across a floor or other supporting surface.

SUMMARY OF THE INVENTION

In accordance with the present invention and the contemplated problems which have and continue to exist in this field, the objectives of this invention are to provide a non-sliding pet food dish with insert dish which has many of the advantages of the animal feeding devices mentioned heretofore and many novel features that result in a pet food dish which is not anticipated, rendered obvious, suggested, or even implied by any of the prior art tool guides, either alone or in any combination thereof.

It is an objective of the present invention to provide a new pet food dish which may be easily and efficiently manufactured and marketed.

Another objective of the present invention is to provide a new pet food dish which includes an outer container for containing a volume of water, a holder disposed within the outer container such that water surrounds the holder and an insert dish removably disposed within the holder for supporting pet food such that insects cannot reach the food across the water, and lids which can be secured to tile outer container and the insert dish to permit transportation and storage of the device when containing both water and food.

Yet, it is another objective of the present invention to provide a new pet food dish which resists sliding upon a support surface.

This invention accomplishes the above and other objectives and overcomes the disadvantages of the prior art by providing a non-sliding pet food dish with insert dish that is simple in design anti construction, inexpensive to fabricate, mid easy to use. The present invention generally comprises a dish for containing food and water for consumption by an animal and comprises an outer container for containing a volume of water. A holder is secured within the outer container to removably receive an insert dish for supporting pet food. The holder is disposed within the outer container in a position such that insects cannot reach the food across the water. Lids can be secured to the outer container and the insert dish to permit transportation and/or storage of the device when containing both water and food. Because the insert dish is removable, it can be stored separately from the outer container.

It is to be understood that the phraseology and terminology employed herein are for the purpose of description and should not be regarded as limiting. As such, those skilled in the art will appreciate that the conception, upon which this disclosure is based, may readily be utilized as a basis for the designing of other structure, methods, and systems for carrying out the several purposes of the present invention. It is important, therefore, that the claims be regarded as including such equivalent constructions insofar as they do not depart from the spirit and scope of the present invention.

Other objects, advantages and capabilities of the invention will become apparent from the following description taken in conjunction with the, accompanying drawings showing the preferred embodiment of the invention.

BRIEF DESCRIPTION OF THE DRAWINGS

The invention will be better understood and the above objects as well as objects other than those set forth above will become apparent when consideration is given to the following detailed description thereof. Such description makes reference to the annexed drawings wherein:

FIG. 1 is a front elevation view of one embodiment of a non-sliding pet food dish with insert dish constructed according to the present invention;

FIG. 2 is a top plan view of the embodiment of FIG. 1 taken from line 2—2;

FIG. 3 is a partial cross-sectional view of the embodiment of FIG. 1 taken from line 3—3 of FIG. 2;

FIG. 4 is an enlarged cross-sectional view of the area set forth in FIG. 3;

FIG. 5 is a partial cross-sectional view of another embodiment of the non-sliding pet food dish with insert dish constructed according to the present invention;

FIG. 6 is a top plan view of yet another embodiment of the non-sliding pet food dish with insert dish constructed according to the present invention;

FIG. 7 is a front elevation view of still another embodiment of the non-sliding pet food dish with insert dish constructed according to the present invention;

FIG. 8 is a top plan view of the embodiment of FIG. 7;

FIG. 9 is a side elevation view of the embodiment of FIG. 7;

FIG. 12 is a side elevation view of the embodiment of FIG. 10.

DESCRIPTION OF THE PREFERRED EMBODIMENTS

Figure 10:
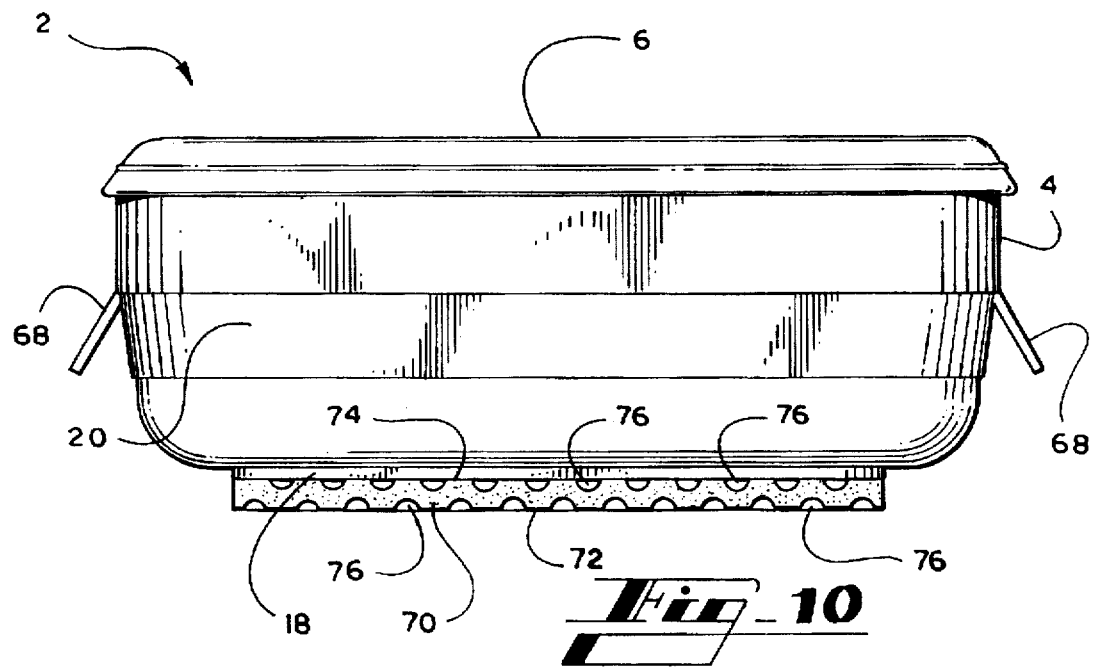
FIG. 10 is a front elevation view of still yet another embodiment of the non-sliding pet food dish with insert dish constructed according to the present invention.

For a fuller understanding of the nature and desired object of this invention, reference should be made to the following detailed description taken in connection with the accompanying drawings. Referring to the drawings wherein like reference numerals designate corresponding parts throughout the several figures, reference is made first to FIG. 1. FIG. 1 of the drawings illustrates an embodiment of a non-sliding pet food dish 2 encompassing the principles and concepts of the present invention.

More specifically as shown in FIGS. 1 through 4, the non-sliding pet food dish 2 comprises an outer container 4 having an outer container lid 6 sealingly securable across an open upper end 8 of the outer container 4. A holder 10 is positioned completely within the outer container 4 and secured to an interior portion thereof. An insert dish 12 is removably placed within the holder 10 and positioned completely within the outer container 4. An insert dish lid 14 is sealingly engagable to the insert dish 12 so as to extend across an open upper end thereof. The holder 10 and the insert dish 12 are spaced from an interior surface of the outer container 4 such that when fluid is positioned within the other container 4 it completely surrounds the holder 10 and the insert dish 12 to preclude access by insects and small rodents to the insert dish 12. By this structure, water can be positioned within the outer container 4 so as to surround the holder 10 and the insert dish 12 with pet food being positioned in the insert dish 12 such that an animal may selectively consumer either the food or the water as desired.

Particularly referring to FIGS. 1 through 3 wherein the non-sliding pet food dish 2 is illustrated in detail, it can be shown the outer container 4 preferably comprises a substantially rectangular outer container bottom wall 18 having an outer container perimeter side wall 20 projecting outer peripheral edge 22 of the outer container bottom wall 18. The outer container perimeter side wall 20 extends upwardly from the outer container bottom wall 18 and terminates in a container upper free edge 24. An outwardly projecting container flange 26 extends from the container upper free edge 24 of the outer container perimeter side wall 20 and is cooperatively engagable with an interior groove (not shown) extending about an interior surface (not shown) of the outer container lid 6, as shown in FIGS. 1 and 3 of the drawings. By this structure, the outer container lid 6 can be selectively snapped over the open upper end 8 of the outer container 4 whereby the flange will cooperatively engage the groove of the outer container lid 6 so as to secure the outer container lid 6 relative to the outer container 4.

With continuing reference to FIGS. 1 through 3 and additionally to FIG. 4, it is also shown that the holder 10 similarly comprises a holder floor 28 which is integrated or otherwise fixedly secured to an outer container interior surface 30 of the outer container bottom wall 18 as shown in FIG. 3 of the drawings. A holder perimeter side wall 30 projects upwardly from a holder outer peripheral edge 32 of the holder floor 28 and terminates in a holder upper free edge 34.

As shown in FIGS. 3 and 4, the insert dish 12 comprises a dish floor 36 and a dish perimeter side wall 38 projecting upwardly from a dish outer peripheral edge 40 of the dish floor 36. It is preferred for the shape of the insert dish 12 to be substantially similar to that of the shape of the holder 10. The dish perimeter side wall 38 extends upwardly from the dish floor 36 and terminates in a dish upper free edge 42. An insert flange 44 extends from the dish upper free edge 42 of the insert dish perimeter side wall 38 of the insert dish 12 and is cooperatively engagable to a correspondingly shaped dish lid groove 46 formed along an interior dish lid surface 48 of the insert dish lid 14 so as to permit sealing engagement of the insert dish lid 14 to the insert dish 12 in a manner similar to that described above for the outer container lid 6 to the outer container 4. Projecting outwardly from the dish perimeter side wall 38 proximate the dish upper free edge 42 is a dish handle 49. The dish handle 48 assists in the removal of the insert dish 12 from the holder 10.

The outer container and insert dish lids 6 and 14, as shown in FIG. 4, are substantially similar in design and configuration, and as such, the following description applies to both. The lids 6 and 14 include a substantially rectangular planar member 50) having an angled side wall 52 projecting outwardly at an oblique angle relative thereto from a lid outer peripheral edge 54 of the planar member 50. The groove matable with the flanges 26 and 44 of the respective outer container or dish perimeter side wall 20 or 38 extends along an interior surface of the angled side wall 52 of the respective lid 6 or 14. Preferably, the non-sliding pet food dish 2 is constructed entirely of a substantially resilient plastic material permitting the outer container and insert dish lids 6 and 14 to be snapped fined onto the flanges projecting from the respective perimeter side walls 20 and 38 of the outer container 4 and the insert dish 12, respectively. By this structure, food positioned within the insert dish 12 can be sealingly secured therein, with water positioned with the outer container 4 being sealingly secured therein by the outer container lid 6, whereby the entire device 2 may then be transported absence a possibility of the water contacting the pet food within the sealed insert dish 12.

Referring now to FIG. 2 of the drawings, it is shown that the holder 10 is preferably oriented such that a longitudinal length thereof extends transversely across an interior of the outer container 4. To this end, it is desirable that a longitudinal dimension of the holder 10 be substantially less than a transverse width of the outer container 4 so as to permit such orthogonal positioning of the holder 10 therein. Further, it is desirable that the outer container 4 be symmetrically oriented about a transverse axis directed transversely cross and bisecting the outer container 4 and oriented substantially orthogonally relative to a longitudinal axis of the outer container 4, with the holder 10 residing laterally of the transverse axis bisecting the outer container 4. By this structure, an animal utilizing the device 2 is afforded a full depth of the outer container 4 along another side of the transverse axis so as to facilitate case of lapping of water therefrom.

Another embodiment of the holder 10 is shown in FIG. 5. Similar to the embodiment of FIG. 3, the holder 10 comprises the holder floor 8 and the holder perimeter side wall 30 that projects upwardly from the holder outer peripheral edge 32 of the holder floor 28 and terminates and the holder upper free edge 34. Juxtaposed with the holder 10 is a bottom wall opening 56 having a bottom wall opening peripheral edge 58. Preferably, the bottom wall opening 56 has the size and shape of the cross-section of the holder 10 along the holder upper free edge 34. Extending upwardly from the bottom wall opening peripheral edge 58 is a holder support wall 60. Preferably, the holder support wall is substantially perpendicular to the outer container bottom wall 18. The holder perimeter side wall 30 depends from the holder support wall 60 proximate the holder other peripheral edge 32. Additionally, the holder perimeter side wall 30 can be integrated into or otherwise fixedly secured to the holder support wall 60. Alternatively, the non-sliding pet food dish 2 may be configured as shown in FIG. 6 of the drawings wherein the holder 10 is substantially centered within the outer container 4 such that a longitudinal axis of the holder 10 is oriented substantially parallel to a longitudinal axis of the outer container 4. Further, it is desirable that the holder 10 be centered such that longitudinal sides thereof are spaced an equal distance from the longitudinal sides of the outer container 4, with transverse sides of the holder 10 being spaced an equal distance from the transverse sides of the outer container 4. By this structure, a plurality of animals can be radially positioned about the outer container 4 and similarly afforded a full depth of the fluid contained within the outer container 4 located between the holder 10 and the outer container 4. The configuration of the holder, 10 can be that as shown in either FIGS. 3 or 5.

Still, another alternative embodiment of the non-sliding pet food dish 2 is shown in FIGS. 7 through 9. A sloping container wall 62 extends outwardly and downwardly from the outer container perimeter side wall 20 proximate the container upper free edge 24 to a container lower free edge 64. To assist an end user in retrieving the non-sliding pet food dish 2 from a support surface (not shown), the container wall 62 a pair of oppositely disposed hand slots 66 proximate the container lower free edge 64.

Figure 11:
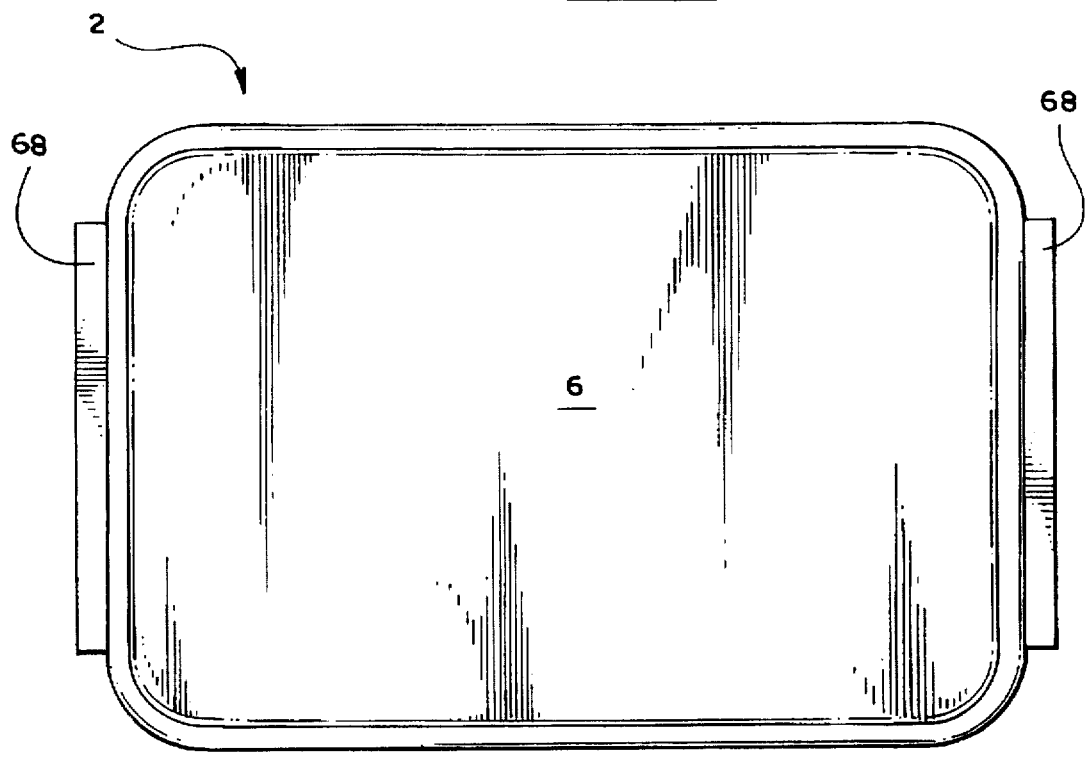
FIG. 11 top plan view of the embodiment of FIG. 10.

Referring now to FIGS. 10 through 12, non-sliding pet food dish 2 has yet another embodiment. In this embodiment, a pair of oppositely disposed container handles 68 extend outwardly, and preferably downwardly, from the outer container perimeter side wall 20.

With reference to FIGS. 1, 9 and 10 to prevent sliding, the non-sliding pet food dish 2 has a pad 70 juxtaposed with the outer container bottom wall 18. The pad has a first side 72 and a second side 74. The first side 72, which is placed in contact with the support surface, preferably has a plurality of indentations 76. More preferred, the indentation are hemispherically-shaped and act as suction cups to grip the support surface and prevent sliding of the device 2 thereupon. As shown in FIGS. 1 and 9, the second side 74 is smooth and it is preferable for the pad 70 having a smooth second side 74 to be affixed to the outer container bottom wall 18. The pad 70 can be affixed to the device 2 bonding, fusing, gluing, epoxying and the like. As shown in FIG. 10, the second side 74 also has indentation, preferably hemispherically-shaped. Although the second side 74 having indentations 76 can be affixed to the outer container bottom wall 18, it is not necessary. To prevent sliding, the pad 70 is first placed onto the support surface and the device 2 then placed onto the pad 70. Preferably, the pad 70 is made from a pliable polymeric material or rubber-like material.

The present invention 10 may be constructed entirely of flexible and washable polymeric materials. Preferably, the non-sliding pet food dish 2 is molded of a polymeric material which is brightly colored so as to assist the end user in locating the non-sliding pet food dish 2 within limited light conditions. Further, it is desirable for the non-sliding pet food dish 2 to be molded of a luminescent or "glow-in-the-dark" material so as to facilitate a location thereof in a dark area such as a yard. Examples of suitable polymers for use in constructing the present invention can be found within the U.S. Pat. Nos. 4,612,3434; 4,259,229; 3,427,273; and 5,237,448, all of which are incorporated herein by reference.

In use, the non-sliding pet food dish 2 according to the present invention can be easily utilized to support a quantity of pet food in a position inaccessible by insects and other crawling creatures. The outer container and insert dish lids 6 and 14 permit the non-sliding pet food dish 2 to be sealed and transported as desired even when full of food and water. Additionally, because the insert dish 12 is removable from the holder 10, the insert dish 12 containing pet food can be separated from the outer container 4 and stored separately.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A pet food dish, comprising:

an outer container having an outer container lid sealingly secured across an open upper end of the outer container;

a holder positioned completely within the outer container and secured to an interior portion thereof, the holder being spaced from an interior surface of the outer container such that when fluid is positioned within the outer container it completely surrounds the holder;

an insert dish removably disposed within the holder and positioned completely within the outer container, the insert dish having an insert dish lid sealingly engaged to the insert dish so as to extend across an open upper end thereof;

wherein the outer container comprises a substantially rectangular outer container bottom wall having an outer container perimeter side wall projecting upwardly from an outer peripheral edge of the outer container bottom wall, the outer container perimeter side wall extending upwardly from the outer container bottom wall and terminating in an upper free edge, the upper free edge including a projecting flange extending from the upper free edge of the outer container perimeter side wall, with the outer container lid being shaped so as to define an interior groove extending about an interior surface of the outer container lid, with the flange of the outer container being cooperatively engaged with the groove of the outer container lid so as to secure the lid relative to the container;

wherein the holder comprises a substantially rectangular holder floor having a holder perimeter side wall projecting upwardly from a holder outer peripheral edge of the holder floor, the holder perimeter side wall extending upwardly from the holder floor and terminating in a holder upper free edge;

wherein the insert dish comprises a substantially rectangular dish floor having a dish perimeter side wall projecting upwardly from a dish outer peripheral edge of the dish floor, the dish perimeter side wall extending upwardly from the dish floor and terminating in a dish upper free edge, the dish upper free edge including a projecting insert flange extending from the dish upper free edge of the dish perimeter side wall, with the insert dish lid being shaped so as to define an interior dish lid groove extending about an interior dish lid surface of the insert dish lid, with the insert flange of the insert dish being cooperatively engaged with the dish lid groove of the insert dish lid so as to secure the insert dish lid relative to the insert dish;

wherein the lids each include a substantially rectangular planar member having an angled side wall projecting outwardly at an angle relative thereto from an outer peripheral edge of the planar member, with respective groove extending along an interior surface of the angled side wall;

wherein the holder is oriented such that a longitudinal length thereof extends transversely across an interior of the outer container;

wherein a longitudinal dimension of the holder is substantially less than a transverse width of the outer container, with the outer container being symmetrically oriented about a transverse axis directed transversely across and bisecting the outer container and oriented substantially relative to a longitudinal axis of the outer container, with the holder residing laterally of the transverse axis bisecting the outer container;

wherein the holder is substantially centered within the outer container such that a longitudinal axis of the holder is oriented substantially parallel to a longitudinal axis of the outer container;

wherein the holder is centered within the outer container such that longitudinal sides of the holder are spaced an equal distance from longitudinal sides of the outer container, with transverse sides of the holder being spaced an equal distance from transverse sides of the outer container; and wherein the outer container bottom wall is integrally formed with the holder floor.

2. A pet food dish as claimed in claim 1, wherein the insert dish has a dish handle projecting outwardly from the dish perimeter side wall proximate the dish upper free edge.

3. A pet food dish as claimed in claim 1, wherein the outer container is constructed of a flexible polymeric material.

4. A pet food dish as claimed in claim 3, wherein the polymeric material of the outer container is brightly colored.

5. A pet food dish as claimed in claim 3, wherein the polymeric material of the outer container comprises a luminescent material.

6. A pet dish as claimed in claim 1, further comprising a pad having a first side and a second side; the first side matingly engaging the outer container bottom wall and retaining the pet food dish on the pad, and the second side engaging and resisting movement upon a support surface.

7. A pet food dish as claimed in claim 6, wherein the first side of the pad has a smooth surface and the first side is affixed to the outer container bottom wall.

8. A pet food dish as claimed in claim 6, wherein the first side of the pad has indentations.

9. A pet food dish as claimed in claim 8, wherein the indentations are hemispherically shaped.

10. A pet food dish as claimed in claim 6, wherein the second side of the pad has indentations.

11. A pet food dish as claimed in claim 10, wherein the indentations are hemispherically shaped.

12. A pet food dish as claimed in claim 1, wherein the pad is constructed of material selected from the group consisting of pliable polymeric material and a rubberized material.

13. A pet food dish as claimed in claim 6, wherein the second side of the pad has indentations.

14. A pet food dish as claimed in claim 1, wherein the outer container has a pair of spaced apart handles extending outwardly from the outer container perimeter side wall on opposite sides thereof.

15. A pet food dish as in claim 1, further comprising a container wall extending outwardly and downwardly from the outer container perimeter side wall proximate the container upper free edge and terminating at a container lower free edge.

16. A pet food dish as claimed in claim 15 wherein the container wall has a pair of spaced apart hand slots disposed proximate the container lower free edge on opposite sides thereof.

17. A pet food dish as claimed in claim 1, wherein the outer container bottom wall has a bottom wall opening juxtaposed with the holder, the bottom wall opening has a bottom wall opening peripheral edge and a holder support wall extending upwardly from the outer container bottom wall at the bottom wall opening peripheral edge, and the holder perimeter side wall depends from the holder support wall.

18. A pet food dish, comprising:

an outer container having an outer container lid sealingly secured across an open upper end of the outer container;

a holder positioned completely within the outer container and secured to an interior portion thereof, the holder being spaced from an interior surface of the outer container such that when fluid is positioned within the outer container it completely surrounds the holder;

insert dish removably disposed within the holder and positioned completely within the outer container, with an insert dish lid sealingly engaged to the insert dish so as to extend across an open upper end thereof, the insert dish comprising a substantially rectangular dish floor having a dish perimeter side wall projecting upwardly from a dish outer peripheral edge of the dish floor;

wherein the outer container comprises a substantially rectangular outer container bottom wall having an outer container perimeter side wall projecting upwardly from an outer peripheral edge of the outer container bottom wall;

wherein the holder comprises a substantially rectangular holder floor having a holder perimeter side wall projecting upwardly from a holder outer peripheral edge of the holder floor; and wherein the holder floor is integrally formed with the bottom wall of the outer container.

19. A pet food dish as claimed in claim 18 wherein the outer container perimeter side wall extends upwardly from the outer container bottom wall and terminates in a container upper free edge, the container upper free edge including a projecting flange extending from the container upper free edge of the outer container perimeter side wall, with the outer container lid being shaped so as to define an interior groove extending about an interior surface of the outer container lid, with the flange of the outer container being cooperatively engaged with the groove of the outer container lid so as to secure the lid relative to the outer container.

20. A pet food dish as claimed in claim 18, wherein the dish perimeter side wall extends upwardly from the dish floor and terminates in a dish upper free edge, the dish upper free edge including a projecting insert flange extending from the dish upper free edge, with the insert dish lid being shaped so as to define an interior groove extending about interior surface of the insert dish lid, with the insert flange being cooperatively engaged with the groove of the insert dish lid so as to secure the insert dish lid relative to the insert dish.

21. A pet food dish as claimed in claim 18, wherein the holder is oriented such tat a longitudinal length thereof extends transversely across an interior of the outer container.

22. A pet food dish as claimed in claim 18, wherein a longitudinal dimension of the holder is substantially less than a transverse width of the outer container, with the outer container being symmetrically oriented about a transverse axis directed transversely across and bisecting the outer container and oriented substantially orthogonally relative to a longitudinal axis of the outer container, with the holder residing laterally of the transvers axis bisecting the outer container.

23. A pet food dish as claimed in claim 22, wherein the holder is substantially center within the outer container such tat a longitudinal axis of the holder is oriented substantially parallel to a longitudinal axis of the outer container.

24. A pet food dish as claimed in claim 23, wherein the holder is centered within the outer container such that longitudinal sides of the holder are spaced an equal distance from longitudinal sides of the outer container, with transverse sides of the holder being spaced an equal distance from transverse sides of the outer container.

25. A pet food dish as claimed in claim 18, wherein the insert dish has a dish handle projecting outwardly from the dish perimeter side wall proximate the dish upper free edge.

26. A pet food dish as claimed in claim 18, wherein the outer container is constructed of a flexible polymeric material.

27. A pet food dish as claimed in claim 26, wherein the polymeric material of the outer container is brightly colored.

28. A pet food dish as claimed in claim 26, wherein the polymeric material of the outer container comprises a luminescent material.

29. A pet food dish as claimed in claim 18, further comprising a pad having a first side and a second side; the first side matingly engaging the outer container bottom wall and retaining the pet food dish on the pad, and the second side engaging and resisting movement upon a support surface.

30. A pet food dish as claimed in claim 29, wherein the first side of the pad has a smooth surface and the first side is affixed to the outer container bottom wall.

31. A pet food dish as claimed in claim 29, wherein the first side of the pad has indentations.

32. A pet food dish as claimed in claim 18, wherein the outer container has a pair of spaced apart handles extending outwardly from the outer container perimeter side wall on opposite sides thereof.

33. A pet food dish as claimed in claim 18, further comprising a container wall extending outwardly and downwardly from the outer container perimeter side wall proximate the container upper free edge and terminating at a container lower free edge.

34. A pet food dish as claimed in claim 33, wherein the container wall has a pair of spaced apart hand slots disposed proximate the container lower free edge on opposite sides thereof.

35. A pet food dish as claimed in claim 18, wherein the outer container bottom wall has a bottom wall opening juxtaposed with holder, the bottom wall opening has a wall opening peripheral edge and a holder support wall extending upwardly from the outer container bottom wall at the bottom wall opening peripheral edge, and the holder perimeter side wall depends from the holder support wall.

36. A pet food dish, comprising:
   an outer container having an outer container lid sealingly secured across an open upper end of the outer container;
   a holder positioned completely within the outer container and fixedly and non-removably secured to an interior portion thereof, the holder being space from an interior surface of the outer container such that when fluid is positioned within the outer container it completely surrounds the holder; and,
   an insert dish removably disposed within the holder and positioned completely within the outer container, with an insert dish lid sealingly engaged to the insert dish so as to extent across an open upper end thereof.

37. A pet food dish as claimed in claim 36, further comprising further comprising a pad having a first side and a second side; the first side matingly engaging the outer container bottom wall and retaining the pet food dish on the pad, and the second side engaging and resisting movement upon a support surface.

* * * * *